(12) United States Patent
K et al.

(10) Patent No.: US 11,502,955 B2
(45) Date of Patent: Nov. 15, 2022

(54) DYNAMIC INTERNET PROTOCOL TRANSLATION USING PORT-CONTROL-PROTOCOL COMMUNICATION

(71) Applicant: Juniper Networks, Inc., Sunnyvale, CA (US)

(72) Inventors: Amal K, Bangalore (IN); Vikramadhithya Karamched, Bangalore (IN); Mahendra Maddur Puttaswamy, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 208 days.

(21) Appl. No.: 16/947,087

(22) Filed: Jul. 17, 2020

(65) Prior Publication Data

US 2022/0021616 A1 Jan. 20, 2022

(51) Int. Cl.
*H04L 45/741* (2022.01)
*H04L 45/42* (2022.01)
*H04L 45/00* (2022.01)
*H04L 61/251* (2022.01)

(52) U.S. Cl.
CPC .......... *H04L 45/741* (2013.01); *H04L 45/42* (2013.01); *H04L 45/72* (2013.01); *H04L 61/251* (2013.01)

(58) Field of Classification Search
None
See application file for complete search history.

(56) References Cited

U.S. PATENT DOCUMENTS

2019/0007314 A1* 1/2019 Kuppannan .......... H04L 61/251

FOREIGN PATENT DOCUMENTS

CN 105208140 B 12/2018

OTHER PUBLICATIONS

Boucadair M., "Discovering NAT64 IPv6 Prefixes Using the Port Control Protocol (PCP); RFC7225.txt," Internet Engineering Task Force, IETF; Standard. Internet Society (ISOC) 4, pp. 1-17, XP015100669, [retrieved on May 16, 2014].
Boucadair M., "Learning NAT64 PREFIX64s using Port Control Protocol (PCP) draft-ietf-pcp-nat64-prefix64-06.txt", Internet Engineering Task Force, Internet Society , Feb. 21, 2014, pp. 1-17, XP015097292.

(Continued)

*Primary Examiner* — Walter J Divito
(74) *Attorney, Agent, or Firm* — Harrity & Harrity, LLP

(57) ABSTRACT

A network device may receive, from a source device, an option request that includes a source address of the source device and a destination address of a destination device, wherein the network device is associated with an Internet protocol version 6 (IPv6) network. The network device may identify a map code that is associated with an address translation for traffic associated with the destination device and may determine, based on identifying the map code, a source prefix code and a destination prefix code for the address translation. The network device may determine a source IPv6 prefix and a destination IPv6 prefix for the address translation based on the source prefix code and the destination prefix code and may provide, to the source device, an option response to the option request to permit the source device to use the source IPv6 prefix and the destination IPv6 prefix for the traffic.

20 Claims, 8 Drawing Sheets

(56) References Cited

OTHER PUBLICATIONS

Extended European Search Report for Application No. EP20194539.1, dated Jan. 22, 2021, 10 pages.

Mawatari et al.,"464XLAT: Combination of Stateful and Stateless Translation; rfc6877.txt," 464XLAT: Combination of Stateful and Stateless Translation; rfc6877.txt, Internet Engineering Task Force, IETF; Standard, Internet Society (ISOC) 4 Rue Des Falaises CH—1205 Geneva, Switzerland, Apr. 3, 2013, pp. 1-14, XP015090335 [retrieved on Apr. 3, 2013].

Sun Q., et al., "Running Multiple PLATs in 464XLAT; draft-sun-v6ops-xlat-multi-02.txt," Running Multiple Plats in 464XLAT; Draft-SUN-V60PS-XLAT-MULTI-02.TXT, Internet Engineering Task Force, IETF; Standardworkingdraft, Internet Society (ISOC), 4. Rue Des Falaises, CH—1205, Geneva, Switzerland, Jun. 26, 2015, pp. 1-8, XP015106904 [retrieved on Jun. 26, 2015].

* cited by examiner

DYNAMIC INTERNET PROTOCOL TRANSLATION USING PORT-CONTROL-PROTOCOL COMMUNICATION

BACKGROUND

Internet protocol (IP) is a communications protocol used for sending and receiving packets over a network (e.g., the Internet). Network address translators (NATs) may provide translation of IP addresses in packets between private IP addresses and public IP addresses. Furthermore, NATs may support translation of IP addresses between different versions of IP and between the same versions of IP.

SUMMARY

In some implementations, a method includes receiving, by a network device and from a client device, an option request that includes a source address of a source device and a destination address of a destination device, wherein the network device is associated with an Internet protocol version 6 (IPv6) network; identifying, by the network device, a map code that is associated with an address translation for traffic associated with the destination device; determining, by the network device and based on identifying the map code, a source prefix code and a destination prefix code for the address translation; determining, by the network device, a source IPv6 prefix and a destination IPv6 prefix for the address translation based on the source prefix code and the destination prefix code; and providing, by the network device and to the client device, an option response to the option request to permit the source device to use the source IPv6 prefix and the destination IPv6 prefix for the traffic.

In some implementations, a network device includes one or more memories and one or more processors to: receive, from a port-control-protocol (PCP) client device, an option request that includes a source address of an IPv4 source device and a destination address of an IPv4 destination device, wherein the network device is associated with an IPv6 network; determine, based on the PCP client device and the IPv4 destination device being associated with one or more IPv4 networks, a source IPv6 prefix and a destination IPv6 prefix for an address translation to facilitate communication between the IPv4 source device and the IPv4 destination device via the IPv6 network; and provide, to the PCP client device, an option response to the option request to cause the IPv4 source device to use the source IPv6 prefix and the destination IPv6 prefix to send traffic to the IPv4 destination device.

In some implementations, a non-transitory computer-readable medium storing instructions includes one or more instructions that, when executed by one or more processors of a source device, cause the one or more processors to: obtain a destination address associated with a destination device; configure, based on the destination address, an option request associated with communicating with the destination device via an IPv6 network; send, to a network device of the IPv6 network, an option request associated with an address translation for traffic associated with the destination device; receive, from the network device and in association with the option request, a source IPv6 prefix and a destination IPv6 prefix; and maintain, in a data structure, the source IPv6 prefix and the destination IPv6 prefix as IPv6 address information for use in sending traffic to the destination device.

DETAILED DESCRIPTION

Figure 1A:
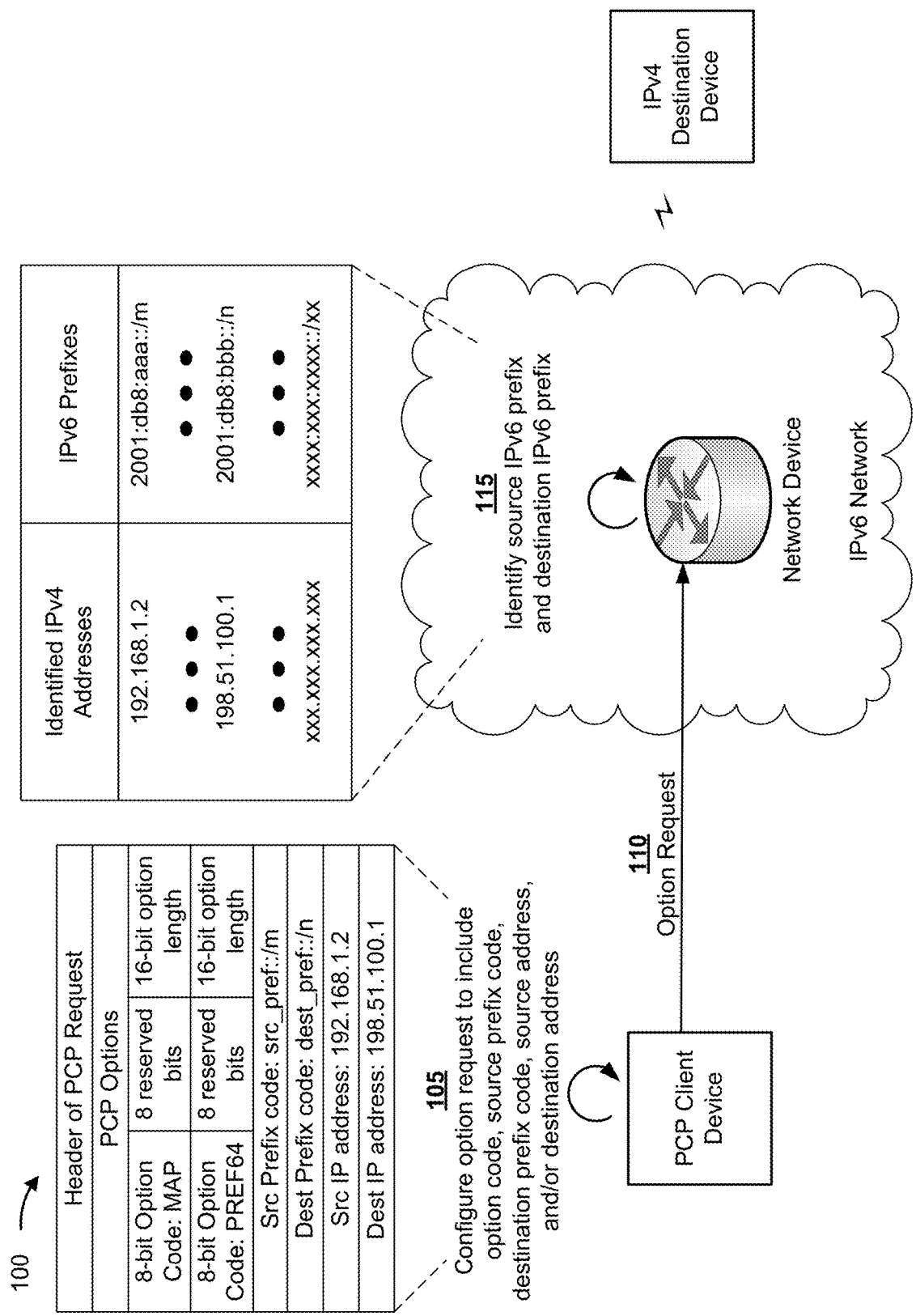
FIGS. 1A-1B are diagrams of an example implementation described herein.

The following detailed description of example implementations refers to the accompanying drawings. The same reference numbers in different drawings may identify the same or similar elements.

Some devices and/or applications may support IPv4. Other devices and/or applications may support IPv6. NATs may be used to map an address space (e.g., IPv4, IPv6, and/or the like) to another address space (e.g., IPv6, IPv4, and/or the like) by modifying network address information in IP datagram headers while the network address information is being routed between network devices.

A 464XLAT architecture provides IPv4 connectivity over an IPv6 network by using stateful protocol translations at core devices and stateless protocol translations at edge devices. For example, an application hosted by a first device may support IPv4 and may need to send an IPv4 packet over an IPv6 network to a second device that also supports IPv4. In this case, the first device may use a customer side translator (CLAT) to perform a stateless translation of IPv4 addresses to IPv6 addresses.

In a stateless translation, the CLAT may translate the IPv4 packet to an IPv6 packet. For example, the CLAT may translate a private IPv4 address included in a header of the packet to an IPv6 address by adding a CLAT prefix to the IPv4 address. Additionally, the first device may provide the IPv6 packet to a network device associated with the IPv6 network. In this case, the network device may use a provider side translator (PLAT) to translate the IPv6 packet to an IPv4 packet, and may translate the IPv6 address to a public IPv4 address without using the CLAT prefix. Furthermore, the network device may provide the IPv4 packet to the second device.

A Stateful-NAT64 architecture provides IPv6 connectivity over an IPv4 network by using stateful protocol translations at core devices. For example, an application hosted by a first device may support IPv6 and may need to send an IPv6 packet over an IPv4 network to a second device that supports IPv4. In this case, the first device may use a NAT to perform a stateful translation to translate the IPv6 packet to an IPv4 packet. For example, the NAT may translate a private IPv6 address to a public IPv4 address and provide the IPv4 packet to the second device.

In some cases, according to the Stateful-NAT64 architecture, the first device may send a port-control-protocol (PCP) request to the NAT and the NAT may provide to the first device, in a PCP response, a prefix and/or suffix that is to be used in a destination IPv6 address of a IPv6 packet that is destined for an IPv4 device. The prefix and/or suffix may indicate, when included with a destination IPv6 address of the IPv6 packet, that the IPv6 address is to be translated to an IPv4 address. In this way, based on the PCP response, the first device may configure IPv6 packets to include the prefix and/or suffix with a IPv6 address so that the NAT is able to determine when to translate IPv6 addresses to IPv4 addresses, so that the NAT may correctly route the IPv6 packet to the IPv4 device.

However, no such PCP request/response functionality is available for the 464XLAT architecture. Accordingly, when a PLAT receives an IPv6 packet from a IPv4 device, unless the PLAT is configured with information indicating how to process traffic from the IPv4 device, the PLAT may not be able to determine whether the PLAT should translate an address of the IPv6 packet to an IPv4 address. This may cause the PLAT to incorrectly route traffic comprising IPv6 packets received by the PLAT from the IPv4 device (e.g., by incorrectly routing the traffic without translating addresses of the traffic when the addresses should be translated, or by incorrectly routing the traffic with translated addresses when the addresses should not be translated). Incorrectly routing the traffic may result in additional computing resources (e.g., processing resources, memory resources, communication resources, and/or the like) being utilized to process, receive, and/or re-transmit the incorrectly routed traffic.

Some implementations described herein provide a PCP client device that sends an option request to a network device of an IPv6 network, to cause the network device to send an option response to the PCP client device that includes a source IPv6 prefix and/or a destination IPv6 prefix. The PCP client device may provide the source IPv6 prefix and the destination IPv6 prefix to an IPv4 source device to allow the IPv4 source device to include the source IPv6 prefix in a source address and the destination IPv6 prefix in a destination address of a packet that is to be communicated to a IPv4 destination device via the network device (e.g. via the IPv6 network). The source IPv6 prefix and the destination IPv6 prefix may indicate to the network device that the IPv4 source device is an IPv4 device, that the IPv4 destination device is an IPv4 device, and/or that the network device is to provide an XLAT 464 translation of the packet. In this way, the network device may determine, based on the source IPv6 prefix in the source address and the destination IPv6 prefix in the destination address of the packet, that the network device is to translate the source address and the destination address to IPv4 addresses to allow the packet to be correctly routed to the IPv4 destination device. This may avoid traffic loss and prevent computing resources (e.g., processing resources, memory resources, communication resources, and/or the like) from being utilized to process, receive, and/or re-transmit incorrectly routed traffic.

In the description to follow, implementations will be described in the context of translating from IPv4 to IPv6 or vice versa. In practice, one or more of these implementations may equally apply to translating from a first version of an IP (referred to generally as IPvX) to a second version of an IP (referred to generally as IPvY) (where X Y), where the first version of the IP is different (i.e., a later version or an earlier version of IP) than the second version of the IP.

Figure 1B:
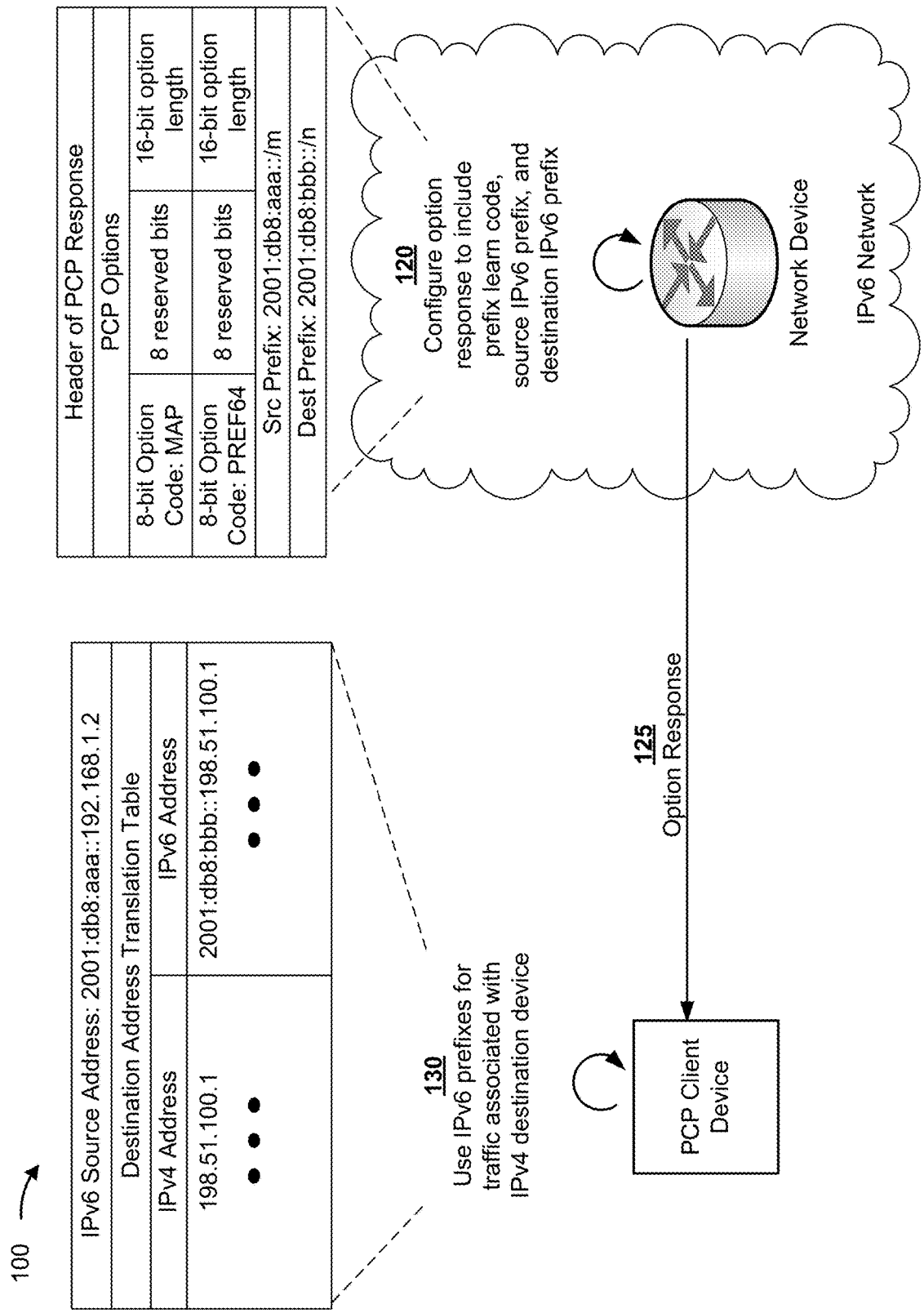

FIGS. 1A-1B are diagrams of an example 100 described herein. As shown in FIGS. 1A-1B, example 100 includes a PCP client device, a network device, and an IPv4 destination device. The network device may be included in an IPv6 network (e.g., a network capable of supporting IPv4 and/or IPv6) and may host a PLAT, a NAT, and/or the like. The PCP client device may comprise a client device of a first network (e.g., a first private IPv4 network) and/or may be included in a CLAT of the first network. The IPv4 destination device may comprise a client device of a second network (e.g., a second private IPv4 network) that is different from the first network.

In some implementations, an IPv4 source device (not shown) may be associated with the PCP client device (e.g., the IPV4 source device may be a client device of the first network) and is to communicate with the IPv4 destination device (e.g., the IPv4 source device is to send one or more packets to the IPv4 destination device). Accordingly, the IPv4 source device may obtain a destination address of the IPv4 destination device from a domain name service (DNS) device or another device. In some implementations, after obtaining the destination address, the IPv4 source device may attempt to communicate with the IPv4 destination device via the IPv6 network.

As shown in FIG. 1A, and by reference number 105, the PCP client device may configure an option request to send to the network device (e.g., to allow the network device to facilitate the IPv4 source device communicating with the IPv4 destination device via the IPv6 network). In some implementations, the option request may include a map request code, an announce request code, and/or the like. For example, as shown in FIG. 1A, the option request may be a map PCP request that includes a "MAP" 8-bit Option Code. In some implementations, the option request may include a prefix code that may be configured (e.g., may have a particular value or text string) to indicate that the option request includes a source prefix code and/or a destination prefix code. For example, as shown in FIG. 1A, the map PCP response may include a "PREF64" 8-bit Option Code to indicate that the option request includes a source prefix code and/or a destination prefix code described herein.

In some implementations, the option request may include the source prefix code and/or the destination prefix code. The source prefix code may be configured (e.g., may have a particular value or text string) to cause the network device to provide a source IPv6 prefix to the PCP client device (e.g., in an option response described herein). The destination prefix code may be configured (e.g., may have a particular value or text string) to cause the network to provide a destination IPv6 prefix to the IPv4 destination device (e.g., in the option response described herein). For example, as shown in FIG. 1A, the map PCP request includes an "src_pref::/m" Src Prefix code (where m≥1) and a "dest_pref::/n" Dest Prefix code (where n≥1) to indicate to the network device that the PCP client device requests a source IPv6 prefix and a destination IPv6 prefix. The source prefix code and the destination prefix code may be preconfigured codes associated with the IPv6 network (e.g. the PCP client device may be preconfigured to include "::/m" or "::/n" as part of any prefix code in the in the option request). In some implementations, the option request may include a source address (e.g., an IPv4 source address) of the IPv4 source device and/or the destination address (e.g., an IPv4 destination address) of the IPv4 destination device. For example, as shown in FIG. 1A, the map PCP request includes a "192.168.1.2" Src IP address and a "198.51.100.1" Dest IP address.

As further shown in FIG. 1A, and by reference number 110, the PCP client device may send the option request to the network device. For example, the PCP client device and/or the network device may establish a communication session with the network device. Accordingly, the PCP client device may send the option request to the network device via the communication session.

As further shown in FIG. 1A, and by reference number 115, the network device may process the option request to identify a source IPv6 prefix and/or a destination IPv6 prefix (e.g., to be used by the IPv4 source device when sending packets to the IPv4 destination device via the IPv6 network). For example, when the network device receives a map PCP request (e.g., such as the map PCP request shown in FIG. 1A), the network device may determine, based on the "MAP" 8-bit Option Code, the "src_pref::/m" Src Prefix code, and/or the "dest_pref::/n" Dest Prefix code, that the network device is to provide an address translation (e.g., an IPv4-to-IPv6-to-IPv4 address translation, also referred to as an XLAT 464 translation). Accordingly, the network device may search a data structure (e.g., included in the network device and/or accessible to the network device), based on the source address included in the map PCP request, to identify a source IPv6 prefix associated with the source address (e.g., as shown in FIG. 1A, the source IPv6 prefix is "2001:db8: aaa::/m" for the "192.168.1.2" source address). Additionally, or alternatively, the network device may search the data structure, based on the destination address included in the map PCP request, to identify a destination IPv6 prefix associated with the destination address (e.g., as shown in FIG. 1A, the destination IPv6 prefix is "2001:db8:bbb::/n" for the "198.51.100.1" destination address). In some implementations, the destination address comprises a public address of the IPv4 destination device, and the destination IPv6 prefix is associated with a public address of the IPv4 destination device. For example, "198.51.100.1" may be an IPv4 public address of the IPv4 destination address and "2001:db8:bbb::/n" may be an IPv6 public address of the IPv4 destination device.

As shown in FIG. 1B, and by reference number 120, the network device may configure an option response (e.g., in response to the option request received by the network device). The option response may include a map response code, an announce response code, and/or the like. For example, as shown in FIG. 1B, the option response may be a map PCP response that includes a "MAP" 8-bit Option Code. The option response may include the source IPv6 prefix and/or the destination IPv6 prefix. For example, as shown in FIG. 1B, the option response includes the "2001: db8:aaa::/m" source IPv6 prefix and the "2001:db8:bbb::/n" destination IPv6 prefix.

In some implementations, the option response may include a prefix learn code that may be configured (e.g., may have a particular value or text string) to cause the IPv4 source device to use the source IPv6 prefix and/or the destination IPv6 prefix when sending traffic to the IPv4 destination device via the IPv6 network. For example, as shown in FIG. 1B, the map PCP response may include a "PREF64" 8-bit Option Code to indicate to the PCP client device that the IPv4 source device is to use the source IPv6 prefix and/or the destination IPv6 prefix when sending traffic to the IPv4 destination device via the network device.

As further shown in FIG. 1B, and by reference number 125, the network device may send the option response to the PCP client device. For example, the network device may send the option response to the IPv4 via the communication session established between the PCP client device and the network device.

As further shown in FIG. 1B, and by reference number 130, the PCP client device may provide the source IPv6 prefix and/or the destination IPv6 prefix to the IPv4 source device to allow the IPv4 source device to use the source IPv6 prefix and/or the destination IPv6 prefix to send traffic (e.g., one or more packets) to the IPv4 destination device (e.g., via the network device of the IPv6 network). In some implementations, the PCP client device may process (e.g., parse) the option response to identify the response code and/or the prefix learn code and may store, based on the response code and/or the prefix learn code, the source IPv6 prefix and/or the destination IPv6 prefix in a data structure (e.g., that is included in the PCP client device and/or accessible to the IPv4 source device). The PCP client device may store the source IPv6 prefix with the source address (e.g., the IPv4 source address) of the source device in the data structure (e.g., as an IPv6 source address) and/or the destination IPv6 prefix with the destination address (e.g., the IPv4 destination address) of the destination device in the data structure (e.g. as an IPv6 destination address).

For example, as shown in FIG. 1B, the PCP client device may store, based on the "MAP" 8-bit Option Code and/or the "PREF64" 8-bit Option Code included in the map PCP response, the "2001:db8:aaa::/m" source IPv6 prefix and the "192.168.1.2" source address (e.g., the IPv4 source address) as a "2001:db8:aaa::192.168.1.2" IPv6 source address. As another example, as shown in FIG. 1B, the PCP client device may store, based on the "MAP" 8-bit Option Code and/or the "PREF64" 8-bit Option Code included in the map PCP response, the "2001:db8:bbb::/n" destination IPv6 prefix and the "198.51.100.1" destination address (e.g., the IPv4 destination address) in a destination address table that associates the "198.51.100.1" destination address with a "2001: db8:bbb::198.51.100.1" IPv6 destination address. Accordingly, the IPv4 source device may include the source IPv6 address in a source address and/or the destination IPv6 address in a destination of a packet that is to be sent to the IPv4 destination device via the network device and the IPv6 network.

In some implementations, the PCP client device may send the packet (that includes the source IPv6 address and/or the destination IPv6 address) to the network device via the communication session established between the PCP client device and the network device. The network device may modify the packet (e.g., by removing the source IPv6 prefix from the source address of the IPv4 packet and/or by removing the destination IPv6 prefix from the destination address of the IPv4 packet) to route the packet to the IPv4 destination device. For example, the network device may modify a packet that includes a "2001:db8:aaa::192.168.1.2" source address and a "2001:db8:bbb:: 198.51.100.1" destination address to have a "192.168.1.2" source address and a "198.51.100.1" destination address. The network device may then translate and/or route the packet to the IPv4 destination device.

Additionally, or alternatively, the network device may receive an additional option request from an IPv6 source device (e.g., that includes a request code, such as a map request code) and the destination address (e.g., the IPv4 destination address) of the IPv4 destination device. The additional option request may include a prefix code that is configured (e.g., may have a particular value or text string) to cause the network device to provide the destination IPv6 prefix in an additional option response (e.g., that is a response to the additional option request). The network device may process the additional option request to identify the destination IPv6 prefix (e.g., in a similar manner as that described herein in relation to FIG. 1A and reference number 115). The network device may configure the additional option response to include a response code, such as a map response code, and the destination IPv6 prefix (e.g., in a similar manner as that described herein in relation to FIG. 1B and reference number 120). The network device may send the additional response to the IPv6 source device to allow the IPv6 source to use the destination IPv6 prefix for traffic that is to be sent to the IPv4 destination device (e.g., in a similar manner as that described herein in relation to FIG. 1B and reference numbers 125 and 130).

As indicated above, FIGS. 1A-1B are provided as an example. Other examples may differ from what is described with regard to FIGS. 1A-1B. The number and arrangement of devices shown in FIGS. 1A-1B are provided as an example. In practice, there may be additional devices, fewer devices, different devices, or differently arranged devices than those shown in FIGS. 1A-1B. Furthermore, two or more devices shown in FIGS. 1A-1B may be implemented within a single device, or a single device shown in FIGS. 1A-1B may be implemented as multiple, distributed devices. Additionally, or alternatively, a set of devices (e.g., one or more devices) shown in FIGS. 1A-1B may perform one or more functions described as being performed by another set of devices shown in FIGS. 1A-1B.

Figure 2:
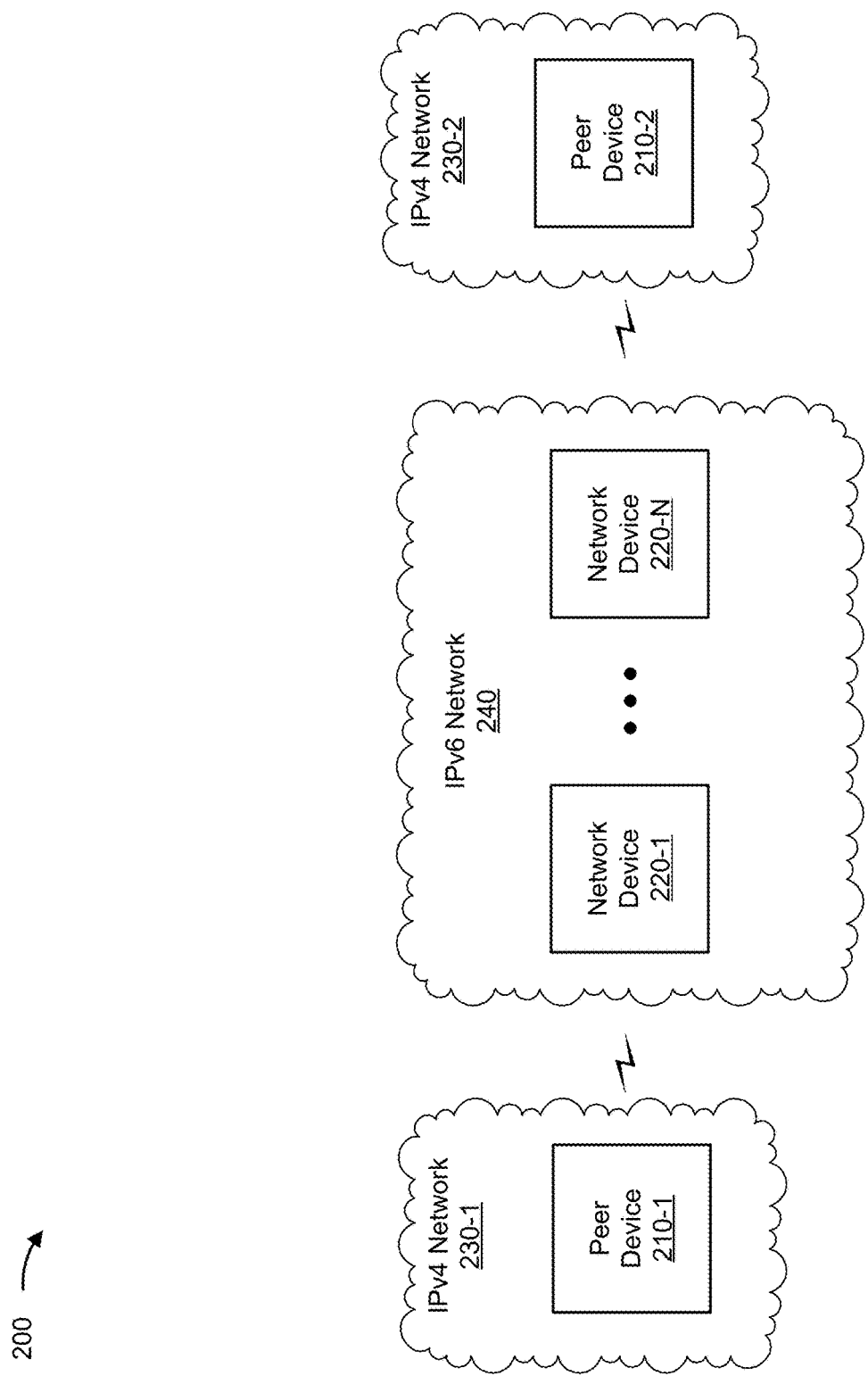
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include one or more peer devices 210, one or more network devices 220-1 through 220-N (N≥1) (hereinafter referred to collectively as "network devices 220", and individually as "network device 220"), a first IPv4 network 230-1 and a second IPv4 network 230-2 (hereinafter referred to collectively as "IPv4 networks 230", and individually as "IPv4 network 230"), and an IPv6 network 240. Devices of environment 200 may interconnect via wired connections, wireless connections, or a combination of wired and wireless connections.

Peer device 210 includes one or more devices capable of receiving and/or providing network traffic. For example, peer device 210 may include a traffic transfer device, such as a router, a gateway, a switch, a firewall, a hub, a bridge, a reverse proxy, a server (e.g., a proxy server, a server executing a virtual machine, etc.), a load balancer, or a similar type of device. Additionally, or alternatively, peer device 210 may include an endpoint device that is a source or a destination for network traffic. For example, peer device 210 may include a computer or a similar type of device.

In some implementations, peer device 210 may receive network traffic from and/or may provide network traffic to other peer devices 210. For example, a peer device 210-1 (e.g., associated with IPv4 network 230-1) may provide network traffic (e.g., one or more packets) to a peer device 210-2 (e.g., associated with IPv4 network 230-2). In this case, the peer device 210-1 may provide the network traffic to peer device 210-2 via a network device 220 of IPv6 network 240. In some implementations, peer device 210 may correspond to the PCP client device and/or the IPv4 destination device described herein in relation to FIGS. 1A-1B.

Network device 220 includes one or more devices (e.g., one or more traffic transfer devices) capable of processing, forwarding, and/or transferring traffic between peer devices (e.g., peer devices 210) and/or traffic transfer devices (e.g., other network devices 220). For example, network device 220 may include a router, such as a label switching router (LSR), a label edge router (LER), an ingress router, an egress router, a provider router (e.g., a provider edge router, a provider core router, and/or the like), a virtual router, or the like. Additionally, or alternatively, network device 220 may include a gateway, a switch, a firewall, a hub, a bridge, a reverse proxy, a server (e.g., a proxy server, a cloud server, a data center server, and/or the like), a load balancer, or another type of traffic transfer device. In some implementations, network device 220 may be a physical device implemented within a housing, such as a chassis. In implementations, network device 220 may be a virtual device implemented by one or more computer devices of a cloud computing environment or a data center.

IPv4 network 230 includes one or more wired and/or wireless networks that supports IPv4 communications. For example, IPv4 network 230 may include a cellular network (e.g., a fifth generation (5G) network, a fourth generation (4G) network, such as a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

IPv6 network 240 includes one or more wired and/or wireless networks that supports IPv6 communications. For example, IPv6 network 240 may include a cellular network (e.g., a fifth generation (5G) network, a fourth generation (4G) network, such as a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
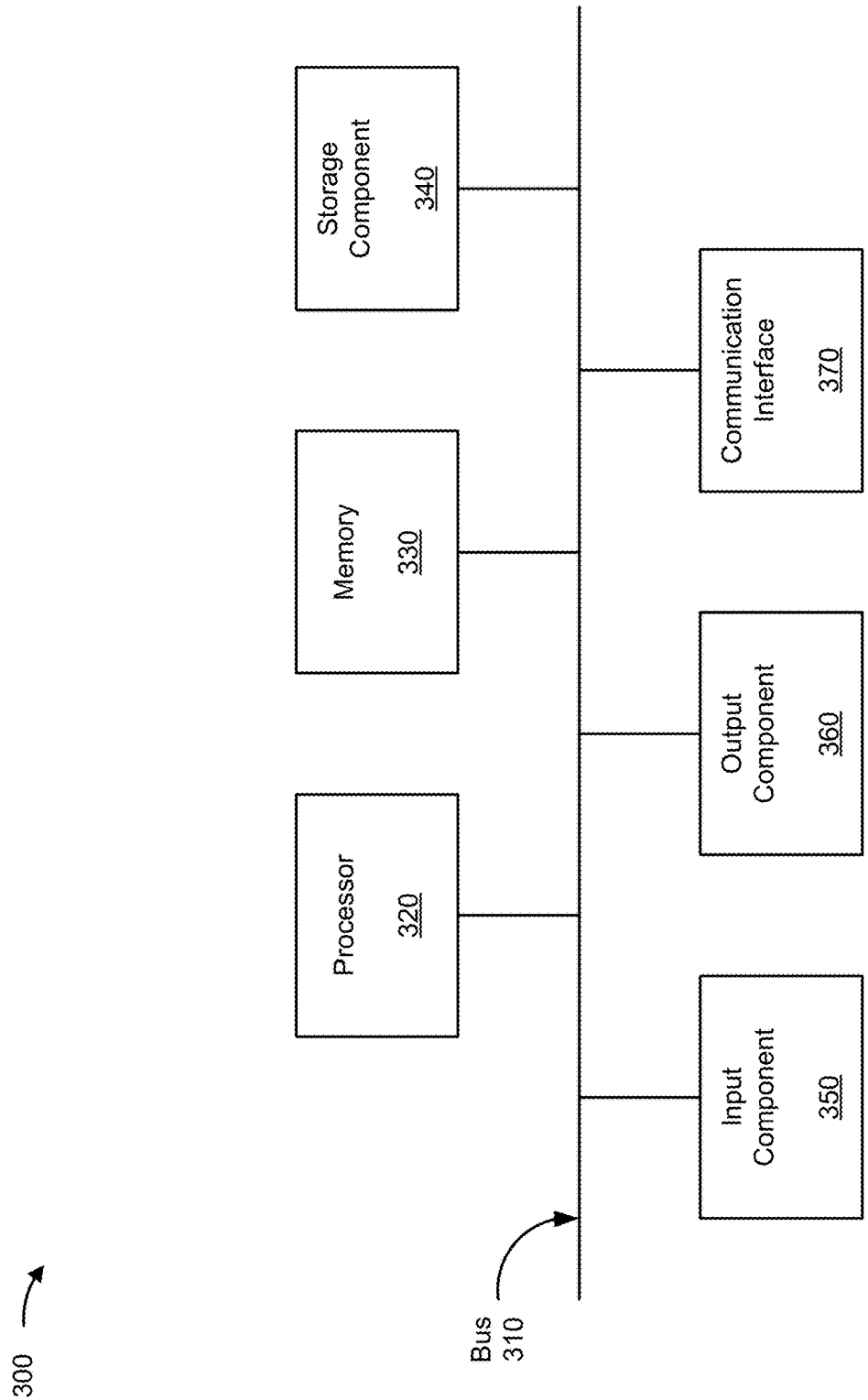
FIGS. 3-4 are diagrams of example components of one or more devices of FIG. 2.

FIG. 3 is a diagram of example components of a device 300, which may correspond to peer device 210 and/or network device 220. In some implementations, peer device 210 and/or network device 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory), a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, an actuator, and/or the like. Output component 360 enables device 300 to provide output, such as via a display, a speaker, and/or one or more light-emitting diodes. Communication interface 370 enables device 300 to communicate with other devices, such as via a wired connection and/or a wireless connection. For example, communication interface 370 may include a receiver, a transmitter, a transceiver, a modem, a network interface card, an antenna, and/or the like.

Device 300 may perform one or more processes described herein. For example, a non-transitory computer-readable medium (e.g., memory 330 and/or storage component 340) may store a set of instructions (e.g., one or more instructions, code, software code, program code, and/or the like) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
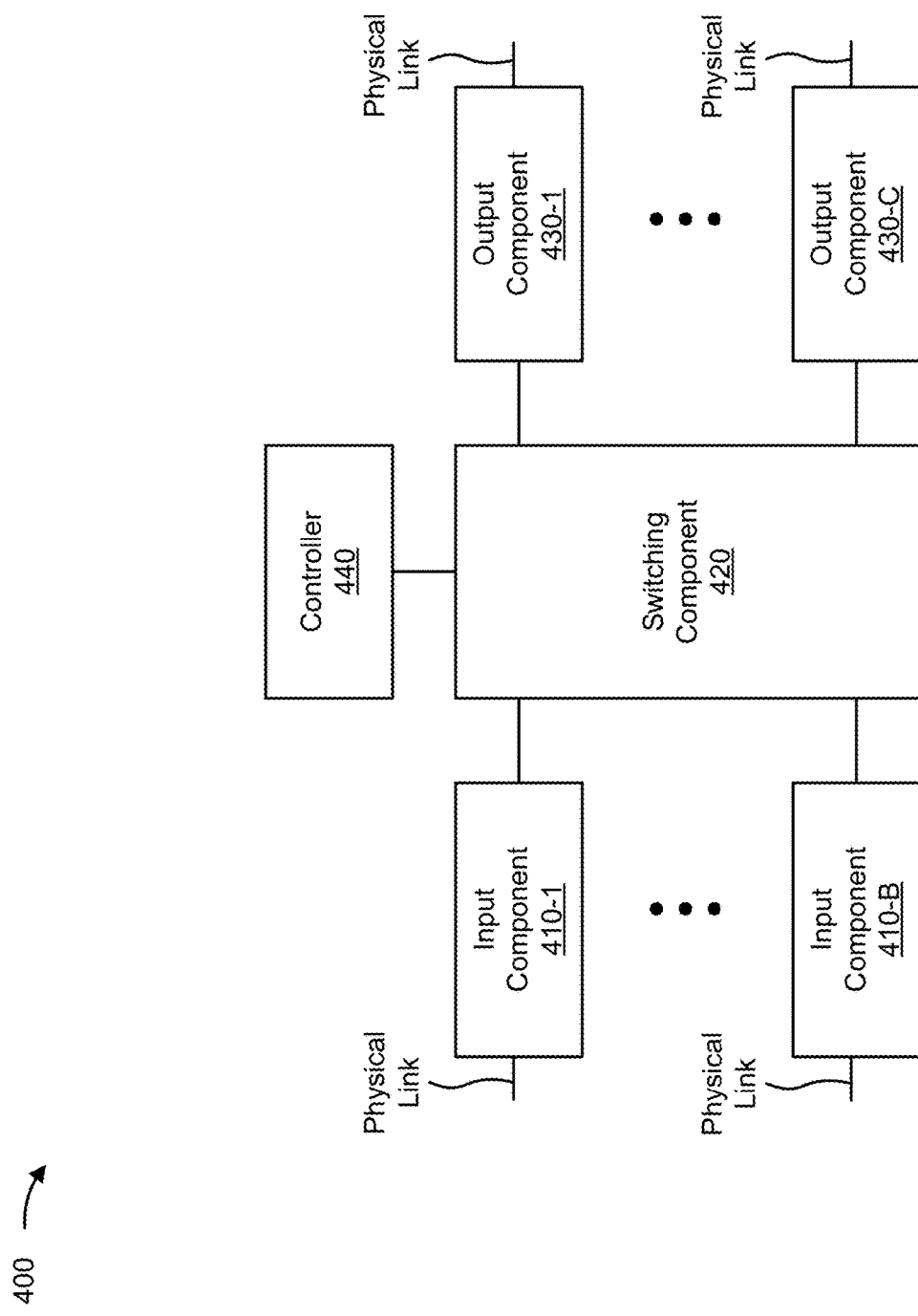

FIG. 4 is a diagram of example components of a device 400. Device 400 may correspond to peer device 210 and/or network device 220. In some implementations, peer device 210 and/or network device 220 may include one or more devices 400 and/or one or more components of device 400. As shown in FIG. 4, device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
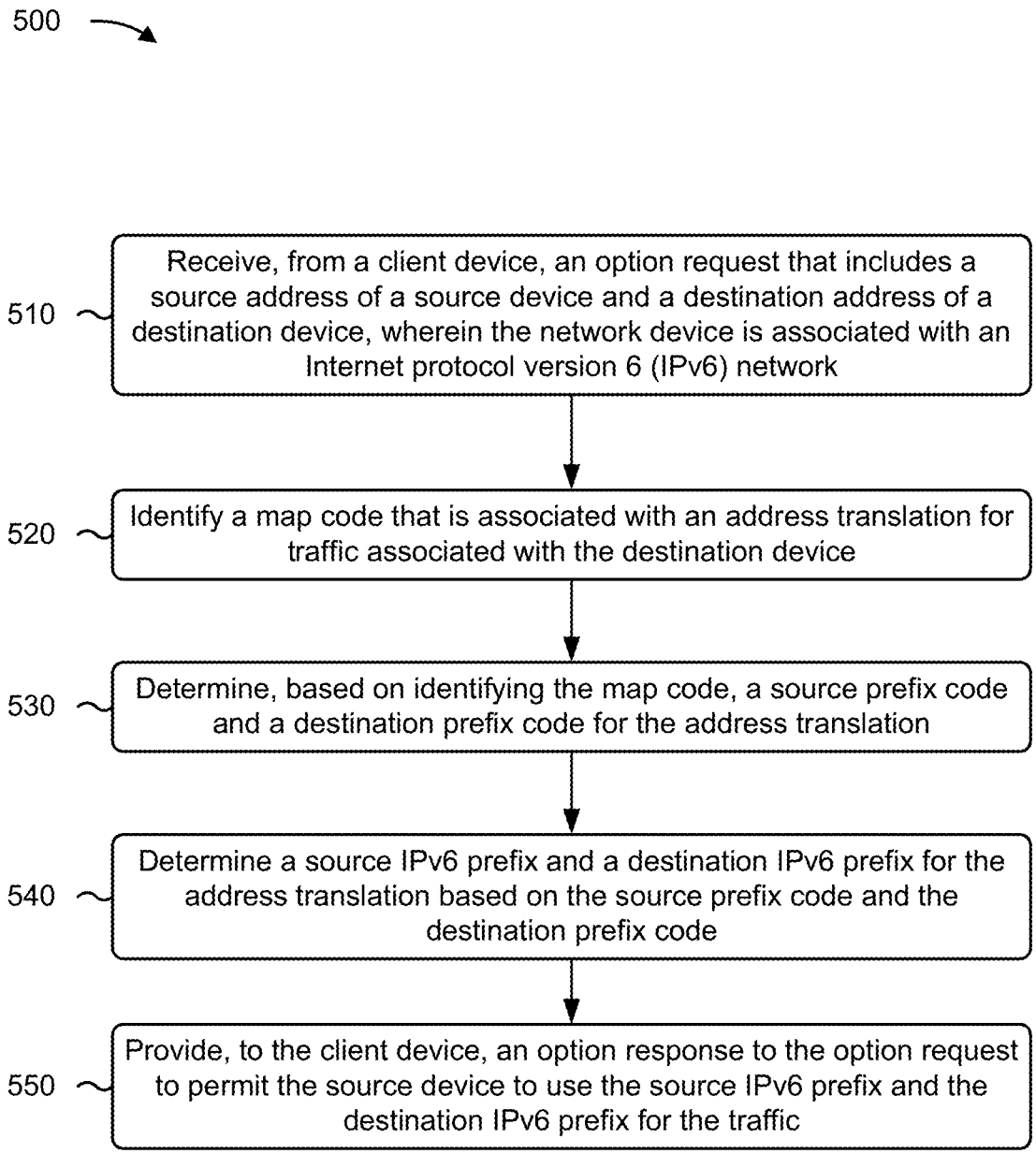
FIGS. 5-7 are flow charts of example processes relating to dynamic Internet protocol translation for port control protocol communication.

FIG. 5 is a flow chart of an example process 500 associated with dynamic Internet protocol translation for PCP communication. In some implementations, one or more process blocks of FIG. 5 may be performed by a network device (e.g., network device 220). In some implementations, one or more process blocks of FIG. 5 may be performed by another device or a group of devices separate from or including the network device, such as a peer device (e.g., peer device 210), and/or the like. Additionally, or alternatively, one or more process blocks of FIG. 5 may be performed by one or more components of a device 300, such as processor 320, memory 330, storage component 340, input component 350, output component 360, communication interface 370, and/or the like; a device 400, such as input component 410, switching component 420, output component 430, controller 440, and/or the like; and/or the like.

As shown in FIG. 5, process 500 may include receiving, from a client device, an option request that includes a source address of a source device and a destination address of a destination device, wherein the network device is associated with an IPv6 network (block 510). For example, the network device may receive, from a client device, an option request that includes a source address of a source device and a destination address of a destination device, as described above. In some implementations, the network device is associated with an IPv6 network.

As further shown in FIG. 5, process 500 may include identifying a map code that is associated with an address translation for traffic associated with the destination device (block 520). For example, the network device may identify a map code that is associated with an address translation for traffic associated with the destination device, as described above.

As further shown in FIG. 5, process 500 may include determining, based on identifying the map code, a source prefix code and a destination prefix code for the address translation (block 530). For example, the network device may determine, based on identifying the map code, a source prefix code and a destination prefix code for the address translation, as described above.

As further shown in FIG. 5, process 500 may include determining a source IPv6 prefix and a destination IPv6 prefix for the address translation based on the source prefix code and the destination prefix code (block 540). For example, the network device may determine a source IPv6 prefix and a destination IPv6 prefix for the address translation based on the source prefix code and the destination prefix code, as described above.

As further shown in FIG. 5, process 500 may include providing, to the client device, an option response to the option request to permit the source device to use the source IPv6 prefix and the destination IPv6 prefix for the traffic (block 550). For example, the network device may provide, to the client device, an option response to the option request to permit the source device to use the source IPv6 prefix and the destination IPv6 prefix for the traffic, as described above.

Process 500 may include additional implementations, such as any single implementation or any combination of implementations described below and/or in connection with one or more other processes described elsewhere herein.

In a first implementation, the source device is an IPv4 device and the destination device is an IPv4 device.

In a second implementation, alone or in combination with the first implementation, the destination address comprises a public address of the destination device and the destination IPv6 prefix is associated with a public address of the destination device.

In a third implementation, alone or in combination with one or more of the first and second implementations, the address translation comprises an IPv4-to-IPv6-to-IPv4 address translation.

In a fourth implementation, alone or in combination with one or more of the first through third implementations, the option request comprises a PCP request and the map code is a PCP option code.

In a fifth implementation, alone or in combination with one or more of the first through fourth implementations, process 500 includes determining that the address translation is associated with an IPv4-to-IPv6-to-IPv4 address translation based on the source prefix code and the destination prefix code being included in the option request, wherein the source IPv6 prefix and the destination IPv6 prefix are identified based on determining that the address translation is associated with the IPv4-to-IPv6-to-IPv4 address translation.

In a sixth implementation, alone or in combination with one or more of the first through fifth implementations, the option response includes the map code and a prefix learn code, wherein the option response, based on including the map code and the prefix learn code, is configured to cause the source device to use the source IPv6 prefix with the source address, and the destination IPv6 prefix with the destination address, as address information for the traffic.

In a seventh implementation, alone or in combination with one or more of the first through sixth implementations, the option request is a first option request, and the option response is a first option response that includes the source IPv6 prefix, and process 500 includes receiving, from an IPv6 source device, a second option request that includes the map code and an additional prefix code; determining, based on the map code and the additional prefix code, that the IPv6 source device is associated with the IPv6 network, and providing, based on determining that the IPv6 source device is associated with the IPv6 network, a second option response that includes the destination IPv6 prefix, to permit the IPv6 source device to use the destination IPv6 prefix for traffic that is associated with the destination device.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
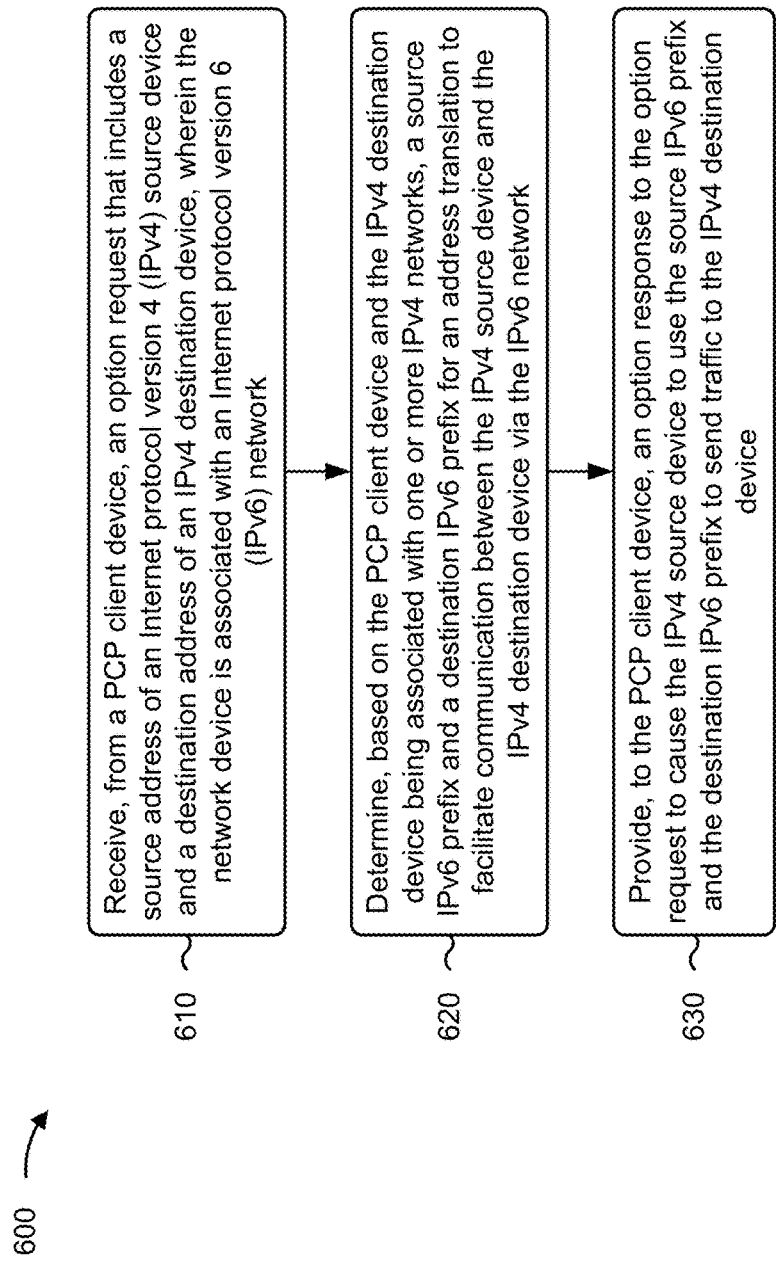

FIG. 6 is a flow chart of an example process 600 associated with dynamic Internet protocol translation for PCP communication. In some implementations, one or more process blocks of FIG. 6 may be performed by a network device (e.g., network device 220). In some implementations, one or more process blocks of FIG. 6 may be performed by another device or a group of devices separate from or including the network device, such as a peer device (e.g., peer device 210), and/or the like. Additionally, or alternatively, one or more process blocks of FIG. 6 may be performed by one or more components of a device 300, such as processor 320, memory 330, storage component 340, input component 350, output component 360, communication interface 370, and/or the like; a device 400, such as input component 410, switching component 420, output component 430, controller 440, and/or the like; and/or the like.

As shown in FIG. 6, process 600 may include receiving, from an PCP client device, an option request that includes a source address of an IPv4 source device and a destination address of an IPv4 destination device, wherein the network device is associated with an IPv6 network (block 610). For example, the network device may receive, from an PCP client device, an option request that includes a source address of an IPv4 source device and a destination address of an IPv4 destination device, as described above. In some implementations, the network device is associated with an IPv6 network.

As further shown in FIG. 6, process 600 may include determining, based on the PCP client device and the IPv4 destination device being associated with one or more IPv4 networks, a source IPv6 prefix and a destination IPv6 prefix for an address translation to facilitate communication between the IPv4 source device and the IPv4 destination device via the IPv6 network (block 620). For example, the network device may determine, based on the PCP client device and the IPv4 destination device being associated with one or more IPv4 networks, a source IPv6 prefix and a destination IPv6 prefix for an address translation to facilitate communication between the IPv4 source device and the IPv4 destination device via the IPv6 network, as described above.

As further shown in FIG. 6, process 600 may include providing, to the PCP client device, an option response to the option request to cause the IPv4 source device to use the source IPv6 prefix and the destination IPv6 prefix to send traffic to the IPv4 destination device (block 630). For example, the network device may provide, to the PCP client device, an option response to the option request to cause the IPv4 source device to use the source IPv6 prefix and the destination IPv6 prefix to send traffic to the IPv4 destination device, as described above.

Process 600 may include additional implementations, such as any single implementation or any combination of implementations described below and/or in connection with one or more other processes described elsewhere herein.

In a first implementation, the PCP client device comprises an IPv4 client device of a first network and the IPv4 destination devices an IPv4 server device of a second network that is different from the first network.

In a second implementation, alone or in combination with the first implementation, the source IPv6 prefix and the destination IPv6 prefix are determined based on the option request including a map code, a source prefix code, and a destination prefix code.

In a third implementation, alone or in combination with one or more of the first and second implementations, the option request is a map request that is associated with a PCP and identified by a map code of the PCP.

In a fourth implementation, alone or in combination with one or more of the first through third implementations, process 600 includes determining that the address translation is associated with an IPv4-to-IPv6-to-IPv4 address translation based on the PCP client device and the IPv4 destination device being associated with the one or more IPv4 networks.

In a fifth implementation, alone or in combination with one or more of the first through fourth implementations, the option response includes a prefix learn code associated with a PCP, wherein the option response, based on including the prefix learn code, is configured to cause the IPv4 source device to use the source IPv6 prefix with the source address, and the destination IPv6 prefix with the destination address, as address information for the traffic.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
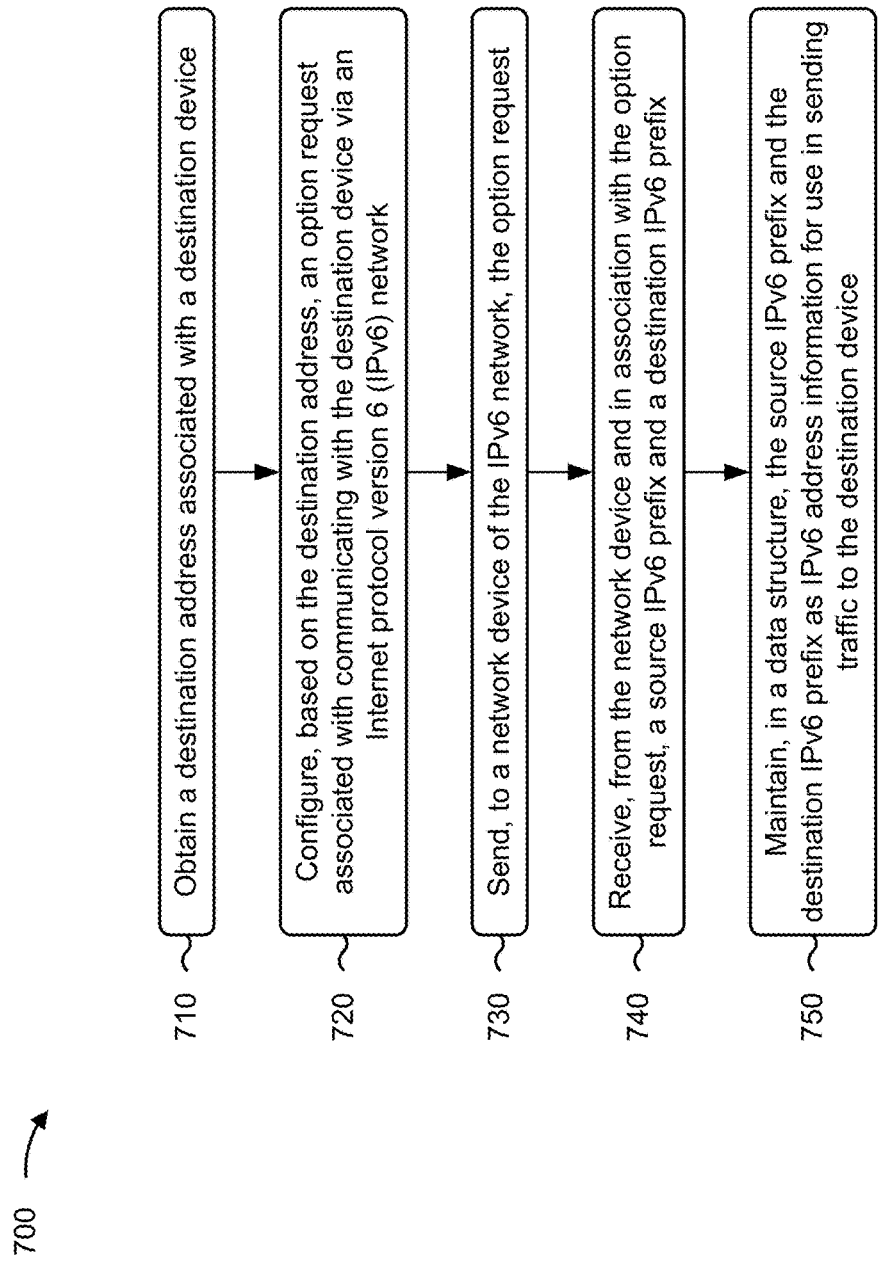

FIG. 7 is a flow chart of an example process 700 associated with dynamic Internet protocol translation for PCP communication. In some implementations, one or more process blocks of FIG. 7 may be performed by a peer device (e.g., peer device 210). In some implementations, one or more process blocks of FIG. 6 may be performed by another device or a group of devices separate from or including the network device, such as a network device (e.g., network device 220), and/or the like. Additionally, or alternatively, one or more process blocks of FIG. 7 may be performed by one or more components of a device 300, such as processor 320, memory 330, storage component 340, input component 350, output component 360, communication interface 370, and/or the like; a device 400, such as input component 410, switching component 420, output component 430, controller 440, and/or the like; and/or the like.

As shown in FIG. 7, process 700 may include obtaining a destination address associated with a destination device (block 710). For example, the peer device may obtain a destination address associated with a destination device, as described above.

As further shown in FIG. 7, process 700 may include configuring, based on the destination address, an option request associated with communicating with the destination device via an IPv6 network (block 720). For example, the peer device may configure, based on the destination address, an option request associated with communicating with the destination device via an IPv6 network, as described above.

As further shown in FIG. 7, process 700 may include sending, to a network device of the IPv6 network, the option request (block 730). For example, the peer device may send, to a network device of the IPv6 network, the option request, as described above.

As further shown in FIG. 7, process 700 may include receiving, from the network device and in association with the option request, a source IPv6 prefix and a destination IPv6 prefix (block 740). For example, the peer device may receive, from the network device and in association with the option request, a source IPv6 prefix and a destination IPv6 prefix, as described above.

As further shown in FIG. 7, process 700 may include maintaining, in a data structure, the source IPv6 prefix and the destination IPv6 prefix as IPv6 address information for use in sending traffic to the destination device (block 750). For example, the peer device may maintain, in a data structure, the source IPv6 prefix and the destination IPv6 prefix as IPv6 address information for use in sending traffic to the destination device, as described above.

Process 700 may include additional implementations, such as any single implementation or any combination of implementations described below and/or in connection with one or more other processes described elsewhere herein.

In a first implementation, the IPv6 address information includes an IPv6 source address associated with the source device that includes the source IPv6 prefix and a source address of the source device. The IPv6 may also include an IPv6 destination address associated with the destination device that includes the destination IPv6 prefix and the destination address.

In a second implementation, alone or in combination with the first implementation, the source device and the destination device are IPv4 devices.

In a third implementation, alone or in combination with one or more of the first and second implementations, the option request includes a map code, a source prefix code, and a destination prefix code that are configured to cause the network device to provide the source IPv6 prefix and the destination IPv6 prefix, and the source IPv6 prefix and the destination IPv6 prefix are received in an option response that includes the map code and a prefix learn code that is configured to cause the source device to use the source IPv6 prefix and the destination IPv6 prefix when sending the traffic.

In a fourth implementation, alone or in combination with one or more of the first through third implementations, the map code and the prefix learn code are option codes associated with a port-control-protocol (PCP) that is associated with the IPv6 network.

In a fifth implementation, alone or in combination with one or more of the first through fourth implementations, the source prefix code and the destination prefix code are preconfigured codes associated with the IPv6 network.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

As used herein, traffic or content may include a set of packets. "Packet" may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a network device and from a client device, an option request that includes a source address of a source device and a destination address of a destination device,
      wherein the network device is associated with an Internet protocol version 6 (IPv6) network;
   identifying, by the network device, a map code that is associated with an address translation for traffic associated with the destination device;
   determining, by the network device and based on identifying the map code, a source prefix code and a destination prefix code for the address translation;
   determining, by the network device, a source IPv6 prefix and a destination IPv6 prefix for the address translation based on the source prefix code and the destination prefix code; and
   providing, by the network device and to the client device, an option response to the option request to permit the source device to use the source IPv6 prefix and the destination IPv6 prefix for the traffic.

2. The method of claim 1, wherein the source device is an Internet protocol version 4 (IPv4) device and the destination device is an IPv4 device.

3. The method of claim 1, wherein the destination address comprises a public address of the destination device and the destination IPv6 prefix is associated with a public address of the destination device.

4. The method of claim 1, wherein the address translation comprises an Internet protocol version 4 (IPv4)-to-IPv6-to-IPv4 address translation.

5. The method of claim 1, wherein the option request comprises a port-control-protocol (PCP) request and the map code is a PCP option code.

6. The method of claim 1, further comprising:
determining that the address translation is associated with an Internet protocol version 4 (IPv4)-to-IPv6-to-IPv4 address translation based on the source prefix code and the destination prefix code being included in the option request,
wherein the source IPv6 prefix and the destination IPv6 prefix are identified based on determining that the address translation is associated with the IPv4-to-IPv6-to-IPv4 address translation.

7. The method of claim 1, wherein the option response includes the map code and a prefix learn code,
wherein the option response, based on including the map code and the prefix learn code, is configured to cause the source device to use the source IPv6 prefix with the source address and the destination IPv6 prefix with the destination address as address information for the traffic.

8. The method of claim 1, wherein the option request is a first option request, and the option response is a first option response that includes the source IPv6 prefix, further comprising:
receiving, from an IPv6 source device, a second option request that includes the map code and an additional prefix code;
determining, based on the map code and the additional prefix code, that the IPv6 source device is associated with the IPv6 network; and
providing, based on determining that the IPv6 source device is associated with the IPv6 network, a second option response that includes the destination IPv6 prefix to permit the IPv6 source device to use the destination IPv6 prefix for traffic that is associated with the destination device.

9. A network device, comprising:
one or more memories; and
one or more processors to:
receive, from a port-control protocol (PCP) client device, an option request that includes a source address of an Internet protocol version 4 (IPv4) source device and a destination address of an IPv4 destination device,
wherein the network device is associated with an Internet protocol version 6 (IPv6) network;
determine, based on the PCP client device and the IPv4 destination device being associated with one or more IPv4 networks, a source IPv6 prefix and a destination IPv6 prefix for an address translation to facilitate communication between the IPv4 source device and the IPv4 destination device via the IPv6 network; and
provide, to the PCP client device, an option response to the option request to cause the IPv4 source device to use the source IPv6 prefix and the destination IPv6 prefix to send traffic to the IPv4 destination device.

10. The network device of claim 9, wherein the PCP client device comprises an IPv4 client device of a first network and the IPv4 destination device comprises an IPv4 client device of a second network that is different from the first network.

11. The network device of claim 9, wherein the source IPv6 prefix and the destination IPv6 prefix are determined based on the option request including a map code, a source prefix code, and a destination prefix code.

12. The network device of claim 9, wherein the option request is a map request that is associated with a PCP and identified by a map code of the PCP.

13. The network device of claim 9, wherein the one or more processors are further to:
determine that the address translation is associated with an Internet protocol version 4 (IPv4)-to-IPv6-to-IPv4 address translation based on the PCP client device and the IPv4 destination device being associated with the one or more IPv4 networks.

14. The network device of claim 9,
wherein the option response includes a prefix learn code associated with a PCP,
wherein the option response, based on including the prefix learn code, is configured to cause the PCP client device to use the source IPv6 prefix with the source address and the destination IPv6 prefix with the destination address as address information for the traffic.

15. A non-transitory computer-readable medium storing instructions, the instructions comprising:
one or more instructions that, when executed by one or more processors of a client device, cause the one or more processors to:
obtain a destination address associated with a destination device;
configure, based on the destination address, an option request associated with communicating with the destination device via an Internet protocol version 6 (IPv6) network;
send, to a network device of the IPv6 network, the option request;
receive, from the network device and in association with the option request, a source IPv6 prefix and a destination IPv6 prefix; and
maintain, in a data structure, the source IPv6 prefix and the destination IPv6 prefix as IPv6 address information for use in sending traffic to the destination device.

16. The non-transitory computer-readable medium of claim 15, wherein the IPv6 address information includes:
an IPv6 source address associated with a source device that includes:
the source IPv6 prefix, and
a source address of the source device; and
an IPv6 destination address associated with the destination device that includes:
the destination IPv6 prefix, and
the destination address.

17. The non-transitory computer-readable medium of claim 15, wherein a source device and the destination device are Internet protocol version 4 (IPv4) devices.

18. The non-transitory computer-readable medium of claim 15, wherein the option request includes a map code, a source prefix code, and a destination prefix code that are configured to cause the network device to provide the source IPv6 prefix and the destination IPv6 prefix, and
wherein the source IPv6 prefix and the destination IPv6 prefix are received in an option response that includes the map code and a prefix learn code that is configured to cause a source device to use the source IPv6 prefix and the destination IPv6 prefix when sending the traffic.

19. The non-transitory computer-readable medium of claim 18, wherein the map code and the prefix learn code are option codes associated with a port-control-protocol (PCP) that is associated with the IPv6 network.

20. The non-transitory computer-readable medium of claim 18, wherein the source prefix code and the destination prefix code are preconfigured codes associated with the IPv6 network.

* * * * *